United States Patent [19]

Volk et al.

[11] 4,293,977
[45] Oct. 13, 1981

[54] POULTRY TRUSSING DEVICE

[76] Inventors: Anthony J. Volk, 173 E. Syracuse St.;
Henry J. Volk, P.O. Box 1484, both
of Turlock, Calif. 95380

[21] Appl. No.: 99,470
[22] Filed: Dec. 3, 1979
[51] Int. Cl.³ .......................... A22B 5/00; A22C 21/00
[52] U.S. Cl. ........................................... 17/11; 17/44;
17/1 S
[58] Field of Search ............................... 17/1 S, 44, 11

[56] References Cited
U.S. PATENT DOCUMENTS 440,815  11/1890  Maisel ................................. 17/44 X
3,112,515  12/1963  Volk ................................... 17/1 S X Primary Examiner—Willie G. Abercrombie
Attorney, Agent, or Firm—Alvin E. Hendricson

[57] ABSTRACT

A poultry leg retainer formed of a single elongated piece of material that is limitedly resiliently deformable, has a central U-shaped portion adapted to fit in the creases of poultry hocks with extensions to substantially right angle bends with outwardly extending shoulders curving through substantially 90° in a plane inclined to the central portion and to the extensions with hooked legs depending from the shoulders to more positively grip and secure poultry legs to the carcass while admitting of bagging trussed fowl without puncture.

8 Claims, 5 Drawing Figures

U.S. Patent    Oct. 13, 1981    4,293,977
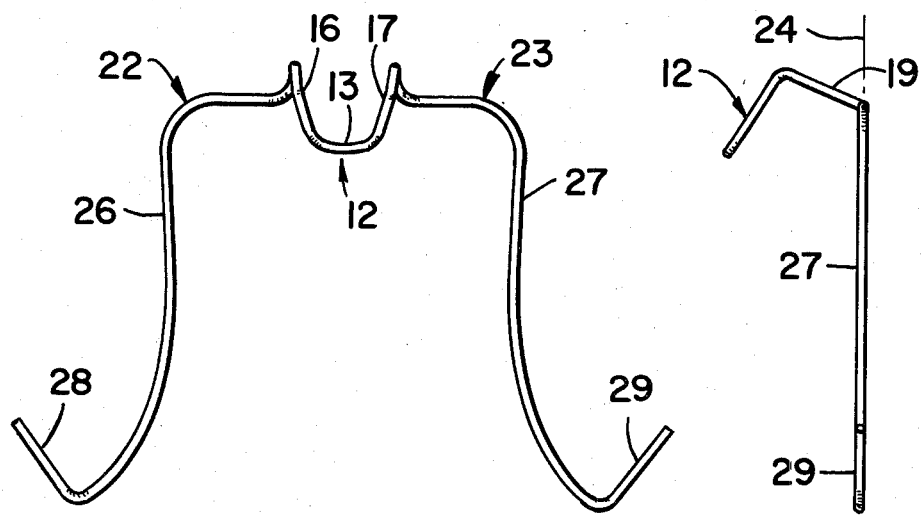
FIG_1    FIG_2
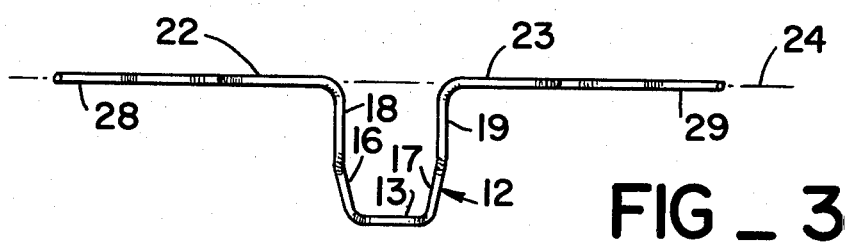
FIG_3
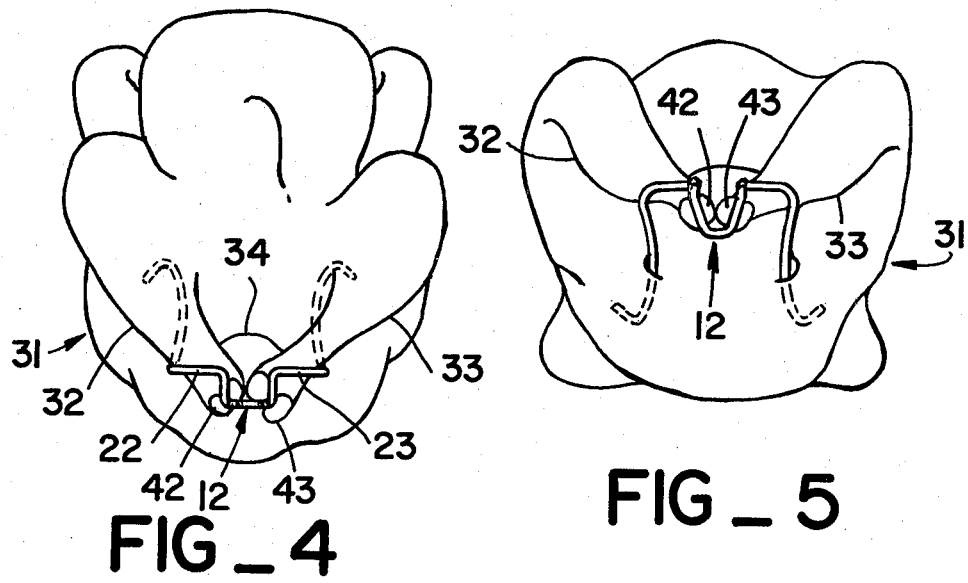
FIG_4    FIG_5

POULTRY TRUSSING DEVICE

BACKGROUND OF INVENTION

In the processing of poultry for the market, it is conventional to truss the enviscerated bird by retaining the legs of the fowl in folded relationship to each other against the body. Although numerous types of ties and the like have been developed for this purpose, the most practical and widely used trussing device, at least for turkeys, is described and claimed in U.S. Pat. No. 3,112,515. This patented device comprises a single wire unit bent to engage the hocks of an eviscerated bird and having depending hooked legs adapted to extend through "kidney holes" in the back of the bird for retaining the legs in place across the rear body opening. The present invention is an improvement over this patented device and may also be inexpensively formed of galvanized wire, for example.

The trussing of poultry during processing to hold the legs in a predetermined position, preferably against the body is primarily accomplished to improve the uniformity of the product and to improve the appearance of the product for sale. Although poultry for processing are usually of relatively uniform size, it is necessary for the legs or drumsticks to be held down for uniform bags or boxes to be employed for packaging and/or shipping. Additionally, processed poultry is much more attractive with the legs held down and close to the body. Unfortunately the legs of poultry have a natural tendency to lock in position up and away from the body as the body temperature is reduced after killing, much like a horse or cow.

Proper trussing of poultry during processing requires that the joint between thigh and leg be severely bent and the leg then be firmly held down against the body. Such trussing is extremely difficult after cooling when the joints become locked in an undesirable position. Modern cooling and chilling procedures are employed in present day processing to save time; however, these procedures incorporate rough handling of the poultry so that it is more difficult to hold the legs in desired or trussed position. Consequently, the present device has been developed to solve these problems.

The ever growing popularity of turkey meat has produced advanced processing techniques and equipment for more effective and automated processing of poultry. The foregoing has increased the demands on and necessitated changes and improvements in trussing devices. While the practicality of the above-described device has long been established, the present invention has been designed and structured to be more effective in meeting these demands.

SUMMARY OF INVENTION

The present invention comprises a unitary retaining device for poultry, such as turkeys, adapted to positively engage the hocks of turkey legs and to be anchored to the poultry carcass so as to truss the legs tightly to the body across the rear body opening of an eviscerated bird. The device may be formed of a stiff resilient wire, for example, that is impervious to poultry processing chemicals and treatment, or a suitable plastic.

The trussing device or poultry leg retainer of the present invention is formed as a single elongated piece of material that is limitedly resiliently deformable. The center of the retainer comprises a U-shaped portion having sides adapted to fit into natural crevices in the end of each hock or leg knuckle for restraining the legs from the natural tendency to extend rearwardly of the body. The central portion is connected to right angle portions extending laterally outward for seating in the natural depressions above the hocks and outwardly over a portion of the legs to counter the natural tendency of the legs to extend upward from the body. Laterally outward of the right angle portions the retainer curves 90° to extend downwardly along the outside of each leg to counteract the natural tendency of the legs to extend laterally outward of the body. The retainer is completed by downwardly extending legs adapted for disposition within the body and having a hook at the lower end of each for insertion in natural pockets on opposite sides of the backbone as a secure and effective anchor for the retainer. Poultry trussed with the present invention have the legs thereof held together in substantially complete closing relationship to the rear opening to the body cavity. This closure is so effective that it is not necessary to sew or otherwise secure the rear opening after stuffing the poultry.

The central U-shaped portion of the invention maximizes the engagement of retainer and hock to minimize the chance of untrussing, particularly during processing. The parallel portions and lateral extensions therefrom fit tightly over the legs above the hocks to minimize bending of the retainer and puncturing of tight fitting plastic bagging. The shoulder portions with a substantially 90° bend cause the retainer to more securely seat over the leg of the fowl to limit slippage and leg movement, particularly during handling of the fowl. In addition to the foregoing, the legs are more curved into the hooks from which they extend in order to more readily extend the hooks about internal tissue and fat of the fowl when the hooks are inserted in the kidney sockets of a fowl for insuring full seating of each hook.

In the evolution of turkey processing, for example, there have been added various steps and procedures for improving the end results. Of these additions there are included at least some such as cooling and freezing which apply substantial strains on trussing devices. Tumbling of a trussed turkey, for example, tends to dislodge the legs from trussed position by the equivalent of blows on the legs and hocks. Furthermore, after chilling of processed turkeys it is very difficult, if not impossible, to retruss a bird that may become untrussed in the processing because the bird is too stiff to be manipulated. Thus very secure trussing is quite important, and the present invention is particularly directed to maximizing the trussing action to prevent inadvertant untrussing during processing.

DESCRIPTION OF FIGURES

The present invention is illustrated as to a preferred embodiment in the accompanying drawing wherein:

FIG. 1 is a front elevational view of a trussing device in accordance with the present invention;

FIG. 2 is a side elevational view of the device of FIG. 1;

FIG. 3 is a top plan view of the device of FIG. 1;

FIG. 4 is an illustration of the device of FIG. 1 in trussing porition on a turkey as viewed from above; and FIG. 5 is a rear end view of a turkey having the device of FIG. 1 installed in trussing relation thereto.

DESCRIPTION OF PREFERRED EMBODIMENT

The present invention, as illustrated in FIGS. 1, 2, and 3 of the drawings will be seen to include a central U-shaped portion 12, lying in a plane inclined downwardly and outwardly from the plane of FIG. 1. This U-shaped portion has a substantially straight bottom, 13, with upwardly extending sides 16 and 17 slightly inclined outwardly from the bottom, again, as illustrated in FIG. 1. This U-shaped portion 12 is adapted to engage the creases in the hocks of a bird by means of the side elements 16 and 17, as is further discussed below. The upper ends of the sides of the U-shaped portion 12 extend as segments 18 and 19 in parallel relation to each other, and inclined downwardly whereat the device is sharply bent at right angles outwardly to form shoulders 22 and 23. The upper surfaces of the shoulder 22 and 23 are generally horizontally disposed although slightly tapered downwardly and outwardly from the respective segments 18 and 19, again as illustrated in the drawings. The shoulders 22 and 23 curve gently downward through an angle of about 90 degrees in a vertical plane 24. The lower ends of each of the depending legs 26 and 27 are bent outwardly and upwardly to form hooks 28 and 29 respectively; and it is noted that the ends of these hooks are substantially displaced from the respective legs for the reasons set forth below.

The trussing device, as described above, is referenced to a vertical plane 24, solely for the purpose of description of the relation of portions of the device to each other without any intention to indicate that the device is employed in the vertical position. In the side view shown in FIG. 2, the legs with hooked ends and shoulders extending from the top of the legs, will be seen to lie in the single vertical plane 24. The U-shaped central portion 12 of the device is inclined at an angle of about 45 degrees to this plane, and the upper ends of this U-shaped portion are connected to the shoulders 23 by the segments 18 and 19 disposed at an angle of about 105 degrees to the U-shaped portion.

Certain portions of the present device are particularly formed and reletively dimensioned for improving the trussing action of the invention, and this is best described in connection with the application of the present invention to the body of a fowl such as a turkey. Reference is made to FIGS. 4 and 5 illustrating application of the present invention in the trussing of turkey legs. In FIG. 4 there is illustrated in plan view an eviscerated turkey body which has been cleaned and prepared for trussing. The trussing device 11 of the present invention is shown in trussing position engaging the legs 32 and 33 of the turkey.

The dressed fowl 31 includes a tail 34 that is normally placed over the rear body opening of the fowl for retaining stuffing, or the like that may be disposed within the eviscerated body. The legs 32 and 33 are normally drawn together over the tail, which has been pivoted upwardly over the body opening, and these legs are retained in this position by the present invention. The trussing device of the present invention is generally applied to the body of the bird in substantially the same manner as the device of the above noted patent, by placing the legs 26 and 27 of the device into the rear body opening of the bird, and inserting the hooked ends, 28 and 29, in openings in the backbone of the carcass. These openings are sometimes termed kidney holes, and are to be found on each side of the lower portion of the backbone. This provides a firm anchor for the device.

Following insertion of the trussing device, and hooking of same within the body, the tail, 34, is pivoted up over the rear body opening, and the legs, 32 and 33, are folded flat against the body with the hocks thereof over the tail, as illustrated for example in FIG. 5 of the drawing. The central portion of the retainer is then placed over the ends of the turkey legs 32 and 33 with the sides 16 and 17 of the central U shaped portion 13 disposed in the creases of the exposes hocks 42 and 43 of the turkey legs. It is noted in this respect that conventional dressing procedures for fowl include removal of the feet and lower leg portions, so as to expose the hocks or knuckles 42 and 43. With the legs pulled very tightly against the body of the bird, the creases in the hocks are almost verticle so that the slightly inclined sides 16 and 17 of the central U-shaped portion of the trussing device, do fit into these creases with the extensions 18 and 19 therefrom extending across the turkey legs and behind the hocks, as illustrated in FIG. 4. The shoulders, 22 and 23 of the device will thus be seen to be disposed laterally across the upper surface of the legs 32 and 33 and to curve downwardly about the outer sides of the legs, so that the device very firmly engages the turkey legs over a substantial distance thereof. The shoulders 22 and 23 will be seen to engage the turkey legs over substantially the entire extent of these shoulders, and this then provides for a very secure locking of the legs in illustrated trussed position.

The particular configuration of the present invention provides an improved and more secure trussing action for the legs of dressed fowl, and this is quite important, particularly in view of the present day processing steps for fowl. It has become conventional to incorporate a substantial number of processing steps in the preparation of fowl, such as turkey, for the market and thus the requirements of trussing devices are multiplied to ensure complete trussing throughout the processing. The relatively new "Spin Cool" operation and equipment includes substantial movement of trussed fowl, which may dislodge trussing devices. Discovery of a untrussed bird after chilling requires substantial reprocessing, for the bird cannot normally be retrussed in cold condition. The present invention substantially precludes this difficulty. The central U-shaped portion of the present invention causes the retainer thereof to cover a larger portion of the end of the hock of the fowl, so as to minimize the chances of the legs becoming untrussed during processing.

The parallel extensions 18 and 19 of the central U-shaped portion of the device, will accommodate a much greater stress from backward pressure without bending, and fits closer to the legs so as to provide less of an impediment to bagging of the bird without chances of puncturing the bag. The substantially 90 degree bend between each of the extensions 18 and 19 and the adjacent shoulder portion 22 or 23 causes the retainer to more securely seat over the legs of the fowl so that there is much less chance of the legs shifting or slipping during handling of the fowl. Additionally, the legs 26 and 27 curve outwardly to the hooked portions which in turn are rounded so that the hooks become better anchored to provide an improved holding and retention. The angle of the legs and the bend thereof forming the hooks increases the angle formed by the hook to better encompass meat and tissue that covers bone structure adjacent the seating cavities.

It will be seen from the foregoing description that the present invention is clearly related to the device of U.S. Pat. No. 3,112,515, and furthermore provides particular improvements thereover. The structural differences between the present invention and the prior patent are of substantial importance by improving the security of trussing so as to preclude untrussing or dislodgement of the trussing device during processing of fowl.

The present invention has been described above with respect to a single embodiment thereof, however, it will be apparent to those skilled in the art that various modifications and variations are possible within the scope of the present invention. It is thus not intended to limit the present invention to the precise terms or description of details of illustration.

What is claimed is:

1. An improved poultry trussing device formed of a thin elongated strip of rigid but resilient material having a central U-shaped section having a substantially straight bottom portion with substantially parallel extensions of the ends thereof with aligned shoulders extending therefrom substantially perpendicularly thereto and legs depending from said shoulders with hooked ends.

2. An improved poultry trussing device formed of a thin elongated strip of rigid but resilient material having a central U-shaped section with substantially parallel extensions of the ends thereof with aligned shoulders extending therefrom substantially perpendicularly thereto and legs depending from said shoulders with hooked ends, said shoulders and legs lying in a single plane, said central U-shaped section being disposed at an angle to said plane, and said parallel extensions being disposed at an angle to said plane and central section.

3. The trussing device of claim 2 further defined by the angle between said central section and said plane being an acute angle with the bottom of said central U-shaped section closest to the hooked ends of said legs and said extensions extending from the ends of said central U-shaped section in a plane angled toward the hooked ends of said legs.

4. The trussing device of claim 1 further defined by said central U-shaped section having sides thereof disposed at an angle of no more than twenty degrees to each other.

5. The trussing device of claim 1 further defined by said central U-shaped section being disposed in a plane disposed at an angle of the order of ninety degrees to the plane of said extensions.

6. The trussing device of claim 1 further defined by said shoulders extending into said legs through substantially ninety degree bends of the strip.

7. The trussing device of claim 1 further defined by said legs lying in a first plane for engagement of the hooked ends with the backbone of an eviscerated bird, said shoulders lying in said first plane and having aligned upper surfaces for extending over the shanks of legs of the bird folded together against the body and said central U-shaped section being disposed at an acute angle to said plane by said extensions for disposition in creases of hocks of said legs to lock said legs against the body of the bird.

8. An improved turkey trussing device for binding the legs of dressed fowl firmly against the body thereof across a rear body opening comprising a rigid metal wire having limited resiliency and formed to include a central U-shaped section lying in a first plane for engaging the sides thereof in creases of hocks of the legs of the fowl and having substantially parallel extensions of said sides lying in a second plane disposed at an angle to said first plane for extending across the turkey legs above the hocks, oppositely aligned shoulders extending laterally outward from said extensions in a third plane disposed at an angle to said first and second planes and connected by substantially right angle bends to said extensions for disposition across turkey legs and down the outer sides thereof, and a pair of elongated legs lying in said third plane and depending from the outer ends of said shoulders with lower hooked ends for engagement with the backbone of a turkey to retain the legs thereof against the body in trussed position.

* * * * *